United States Patent
Bourgeon et al.

(10) Patent No.: US 12,006,065 B2
(45) Date of Patent: Jun. 11, 2024

(54) METHOD FOR MANUFACTURING A MONOLITHIC AIRCRAFT DOOR BY DIE-CUTTING AND MACHINING

(71) Applicant: Aubert &Duval, Paris (FR)

(72) Inventors: Ludovic Bourgeon, Saint Germain Lembron (FR); Arnaud Blanckaert, Saint Gervazy (FR); Philippe Gail, Brie (FR); Xavier Guyonnet, Toulouse (FR)

(73) Assignee: Aubert & Duval, Paris (FR)

( * ) Notice: Subject to any disclaimer, the term of this patent is extended or adjusted under 35 U.S.C. 154(b) by 0 days.

(21) Appl. No.: 17/996,358

(22) PCT Filed: Apr. 12, 2021

(86) PCT No.: PCT/EP2021/059411
§ 371 (c)(1),
(2) Date: Oct. 17, 2022

(87) PCT Pub. No.: WO2021/209372
PCT Pub. Date: Oct. 21, 2021

(65) Prior Publication Data
US 2023/0242276 A1    Aug. 3, 2023

(30) Foreign Application Priority Data
Apr. 17, 2020 (FR) .................................. FR2003864

(51) Int. Cl.
*B21D 22/02* (2006.01)
*B21D 53/92* (2006.01)
(Continued)

(52) U.S. Cl.
CPC ................ *B64F 5/10* (2017.01); *B21D 22/02* (2013.01); *B21D 53/92* (2013.01); *B23P 13/02* (2013.01);
(Continued)

(58) Field of Classification Search
CPC ...... B23P 13/02; B23P 2700/01; B21D 22/02; B21D 53/92; B21J 5/02; B21J 5/025; B64C 1/1423; B64F 5/10
See application file for complete search history.

(56) References Cited

U.S. PATENT DOCUMENTS 4,557,440 A * 12/1985 Adams .................. B64C 1/1461
244/129.4
6,554,226 B2 * 4/2003 Bold ..................... B64C 1/1461
244/129.5
(Continued)

FOREIGN PATENT DOCUMENTS

FR           3109365 B1 *  4/2022
WO      WO-0210013 A1 *  2/2002 ........... B22D 21/007
(Continued)

Primary Examiner — Jermie E Cozart
(74) Attorney, Agent, or Firm — Defillo & Associates, Inc; Evelyn A. Defillo

(57) ABSTRACT

A method for manufacturing an aircraft door with an integral structure. The method includes the following steps: producing a forged blank (7); die-cutting the forging blank (7) between a substantially smooth lower die (8) and an upper die (9) defining a plurality of cells and producing a die-cut part having a honeycomb structure having an open face and a closed face closed by a wall; an inner wall of the honeycomb structure is machined to define at least one recess defined by a web connecting the closed face and the open face and a base protruding substantially perpendicular to the web on the open face of the die cut component."

12 Claims, 8 Drawing Sheets

(51) Int. Cl.
- *B23P 13/02* (2006.01)
- *B64F 5/10* (2017.01)
- *B21J 5/02* (2006.01)
- *B21J 13/02* (2006.01)
- *B64C 1/14* (2006.01)

(52) U.S. Cl.
CPC ............... *B21J 5/02* (2013.01); *B21J 5/025* (2013.01); *B21J 13/02* (2013.01); *B23P 2700/01* (2013.01); *B64C 1/1423* (2013.01)

(56) References Cited

U.S. PATENT DOCUMENTS

| | | |
|---|---|---|
| 6,817,574 B2 | 11/2004 | Solanille et al. |
| 9,168,996 B2 * | 10/2015 | Haensch ............... B64C 1/1461 |
| 2007/0007390 A1 | 1/2007 | Doerer |
| 2009/0113977 A1 | 5/2009 | Segal |
| 2010/0276543 A1 * | 11/2010 | Schimmler ........... B64C 1/1461 |
| | | 156/92 |

FOREIGN PATENT DOCUMENTS

| | | | |
|---|---|---|---|
| WO | WO03104080 | 12/2003 | |
| WO | WO-2011106869 A1 * | 9/2011 | ............. B21D 22/06 |

* cited by examiner

METHOD FOR MANUFACTURING A MONOLITHIC AIRCRAFT DOOR BY DIE-CUTTING AND MACHINING

CROSS REFERENCE TO RELATED APPLICATION

This application is a national stage entry of PCT/EP2021/059411 filed Apr. 12, 2021, under the International Convention and claiming priority over French Patent Application No. FR2003864 filed Apr. 17, 2020.

TECHNICAL FIELD

The invention concerns the field of aeronautics and relates to methods for manufacturing aircraft doors. These doors are for example passenger boarding doors, emergency exit doors, hold doors or any other opening leaf intended for closing up the fuselage of an aircraft.

PRIOR ART

The manufacture of aircraft doors is generally complex and cumbersome given constraints specific to the field of aeronautics. The passenger boarding doors, for example, are intended to close up wide openings made in the fuselage of the aircraft. These doors must ensure adequate mechanical strength at the closed-up opening, as an extension of the structure of the aircraft. These doors must also ensure a certain airtightness in order to maintain a strong differential pressure during flight between the interior of the cabin and the exterior of the aircraft. Moreover, these doors incorporate numerous elements, such as safety devices, control, guidance and locking mechanisms, or finishing elements, this making the assemblies heavy and complex.

Most aircraft doors currently in service are manufactured by assembling numerous separate parts. Structural beams and reinforcing frames are assembled and are fixed to an outer skin made from a metal plate or a sheet of material. Other functional elements are fitted to this assembly, for example stops making it possible to lock the door. Each element of the door is produced and checked separately and the whole then undergoes a painstaking assembly by installing fixing means, such as rivets or screws.

For example, a passenger boarding door for a commercial airliner is typically formed by an assembly of about 150 parts and 1500 fixing means.

These conventional manufacturing methods for aircraft doors make it possible to meet safety criteria specific to aeronautics, in particular by virtue of the option of checking each one of the parts and by rigorous monitoring, which is admissible in this type of industry in the course of such a complex assembly. That is why this type of assembly method and the corresponding doors are currently widespread in aeronautics.

However, these methods in particular have the following drawbacks:

they require demanding implementation means, in particular for positioning and wedging the parts in order to assemble them with fixing means;

the large number of operations involved in preparing the installation of the fixing means (drilling, countersinking, etc.) gives rise to so many possible ways for parts to be non-compliant, thereby increasing the scrap rate of a production run;

the installation of the fixing means, such as rivets, is lengthy and burdensome, in particular for internal parts and poorly accessible nooks;

the mechanical connections at the fixing means are critical points for the mechanical properties of the whole. Under static conditions, phenomena of shearing of the fixing means and plastic deformation of the holes for fixing, relative to the passage of the loads at these critical points, must be remedied. Moreover, the presence of holes for fixing adversely affects fatigue resistance, this being associated with the presence of overstresses that can cause the initiation of cracks. Aircraft doors must meet high safety criteria, and therefore are the subject of dimensioning in particular with respect to the fixing means, thereby increasing the mass of the door.

These methods of the prior art are therefore lengthy, expensive, and result in aircraft doors that would benefit from a reduction in mass.

There have been numerous attempts to improve the manufacture of aircraft doors, although none have really stood out until now.

For example, the U.S. Pat. No. 6,817,574 proposes casting a door made from aluminium or magnesium alloy in one piece by a sand-casting method. The forms of the door, and in particular its frame, have been adapted to such a method, in particular to allow the withdrawal of casting inserts. The method described in that document overcomes a certain number of drawbacks mentioned above but, however, requires a method that remains lengthy and delicate as a result of the number of operations it requires and that results in aircraft doors which could be optimized in terms of the mechanical characteristics and the mass.

Furthermore, the patent application US2007/0007390 describes an aircraft door made in one piece which is entirely machined from a forged blank. Similarly, that document describes a method for manufacturing an aircraft door that overcomes a certain number of the drawbacks listed above but which, however, results in a cumbersome method as a result of the quantity of machining operations it requires and leads to the production of a door requiring a large number of reinforcements in its frame to exhibit sufficient rigidity.

SUMMARY OF THE INVENTION

The aim of the invention is to improve the prior art methods for manufacturing an aircraft door.

To that end, the invention concerns a method for manufacturing an aircraft door having a monolithic structure comprising an outer skin and an internal frame in one piece, the internal frame having at least one portion having: a core attached transversely to the outer skin; and a flange opposite the outer skin; said method having the following steps:

producing a forged blank with a substantially constant thickness from a metal alloy that can be stamped;

stamping the forged blank between a substantially smooth lower die and an upper die defining cells, a clearance being retained between the lower die and the upper die, and obtaining a stamped part with a cellular structure having an open face and a closed face closed by a wall with a thickness corresponding to the clearance;

machining the internal walls of the cellular structure of the stamped part to define at least one reinforcement delimited: by a core connecting the closed face and the open face; and by a flange projecting substantially perpendicularly to the core, on the open face of the stamped part.

Such a method greatly reduces the number of operations necessary to produce an aircraft door. Also, with respect to the alternative methods relative to the patent applications cited above, the method according to the invention likewise reduces the number of operations and results in less expensive manufacture.

Moreover, the method according to the invention produces an aircraft door with improved mechanical characteristics. The static integrity, fatigue strength and rigidity of the door are reinforced by the design in a single stamped block having: an external face made of the outer skin; an internal face made of the flanges of the frame; a join between these two faces that is formed by the cores of the frame. The stamping techniques make it possible to orient the fibers of the blend which mix with one another with this configuration.

The dimensioning of the elements of the aircraft door can thus be revised downward by limiting the overdimensioning and applying lower safety coefficients in the course of the design.

In addition to improved mechanical characteristics, the aircraft door is also more lightweight in a context in which the reduction of the mass of airplanes is greatly sought for fuel economy and reducing emissions.

Furthermore, the method according to the invention makes it possible to take advantage of the parameters of the stamping and thus makes it possible to adjust the mechanical characteristics resulting from the stamping, as close as possible to the requirement.

The manufacturing method according to the invention can include the following additional features, taken individually or in combination:

the upper die has punches surrounded by recesses defining said cells;

the lower die and the upper die are arched along a curvature defining a curvature for the aircraft door (the aircraft door may have a single or double curvature);

the cellular structure of the stamped part is produced by intersecting ribs;

some ribs are substantially perpendicular to the direction of curvature, and, from among these ribs that are substantially perpendicular to the direction of curvature, those located closer to the center of the stamped part, in the direction of curvature, have a smaller thickness than those located further away from the center;

from among said ribs that are substantially perpendicular to the direction of curvature, those located closer to the center of the stamped part, in the direction of curvature, have side walls forming an angle less than the angle formed by the side walls of those located further away from the center;

the forged blank is substantially planar and is moreover arched by the stamping operation; or the forged blank is pre-arched along the same curvature as the arching of the dies;

the machining step includes a machining operation using a side-and-face milling cutter machining the bottom of the flange and a corresponding portion of the core at the same time;

the machining step includes a machining operation, using a conical milling cutter, of machining a portion of the core located under a flange, the axis of the milling cutter being oblique with respect to the plane of the core;

during the stamping operation, blocks of material are formed on the cellular structure of the stamped part, and the method includes an additional machining step of machining these blocks to form locking stops for the aircraft door.

BRIEF DESCRIPTION THE FIGURES

Other features and advantages of the invention will become apparent from the following nonlimiting description, with reference to the appended drawings in which.

DETAILED DESCRIPTION

Figure 1:
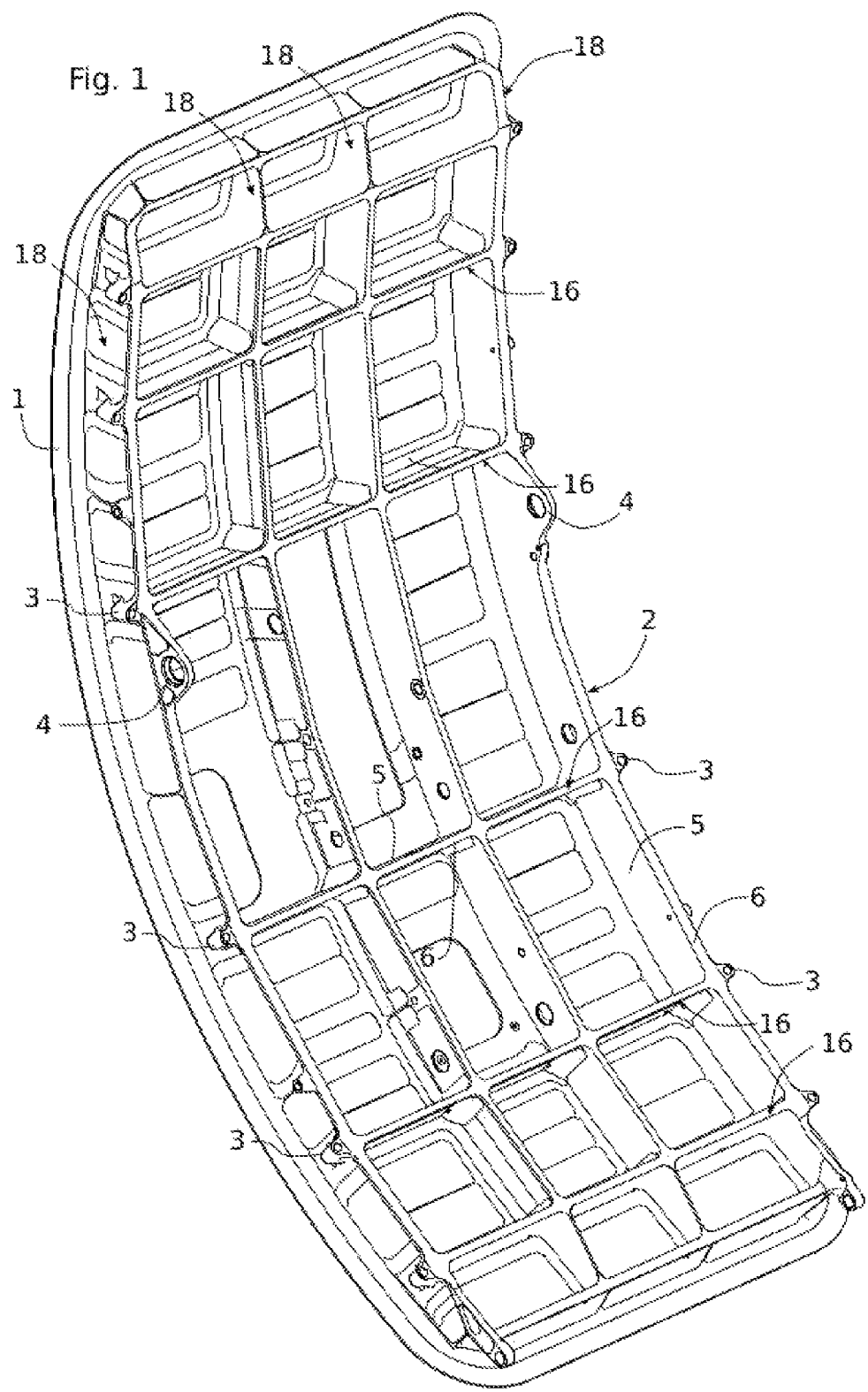
FIG. 1 shows the internal face of an aircraft door obtained by a method according to the invention.
Figure 2:
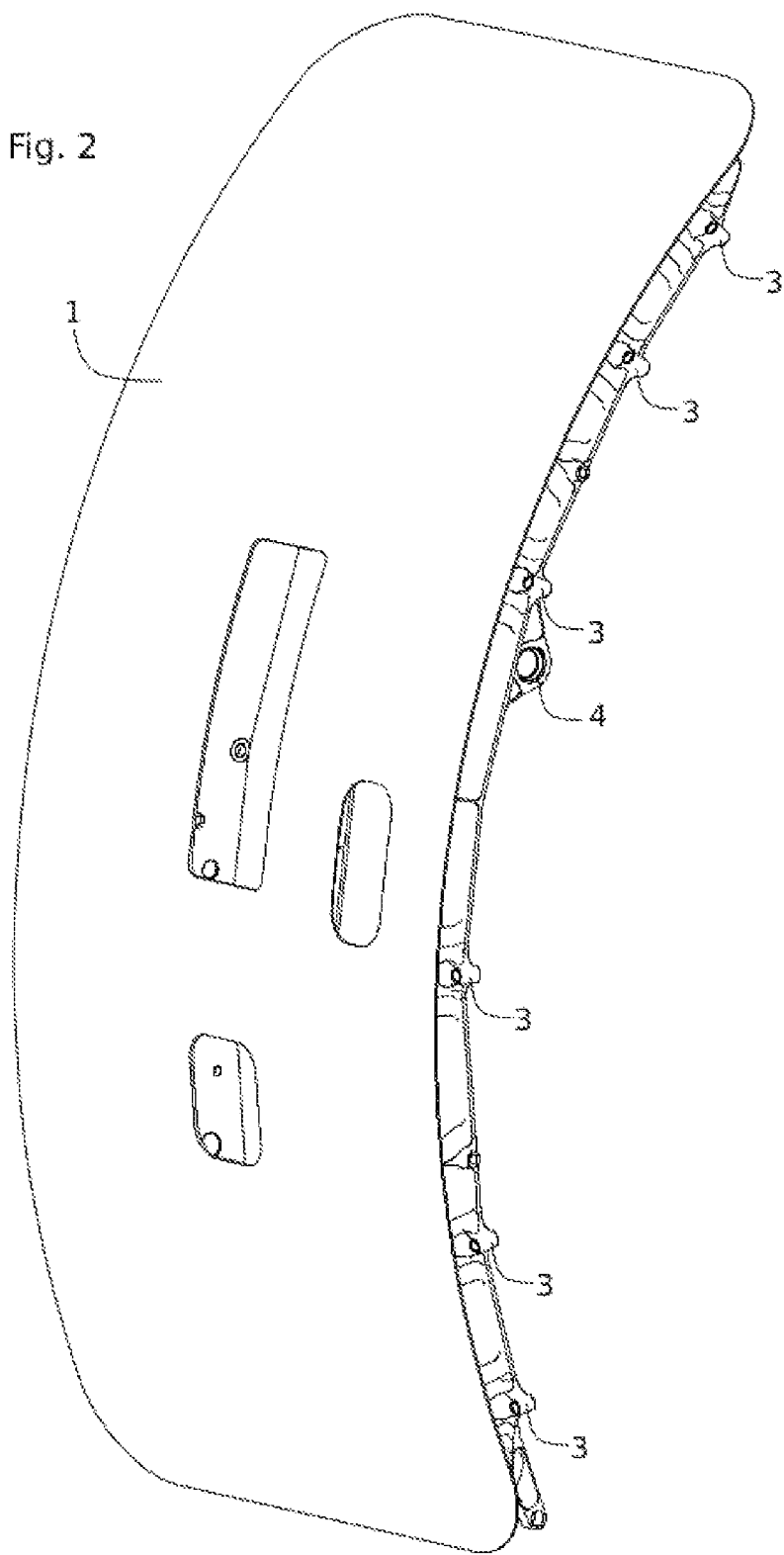
FIG. 2 shows the external face of the aircraft door of FIG. 1.

FIGS. 1 and 2 show perspective views of an aircraft door obtained by the method according to the invention. In the present example, this aircraft door is a passenger boarding door for a commercial airliner and its dimensions are about two meters of height for one meter of width. FIG. 1 illustrates the internal face of this door, that is to say the face facing the inside of the cabin of the aircraft. FIG. 2 illustrates the external face of the door. The door illustrated is a complete mechanical structure, with no need of other structural elements, and is ready to receive various added items of equipment and mechanisms necessary for its function.

The door of FIGS. 1 and 2 is a monolithic door, made in one piece, with no need of any assembly of structural elements. As a variant (see FIG. 11 and the end of the description), this monolithic structure may optionally be hybrid and accommodate additional added structural elements.

The door comprises an outer skin which will be sealed with respect to the fuselage by supplementary seals and windows. In this instance, this outer skin has a thickness ranging from a few millimeters to approximately one centimeter.

The mechanical strength of the outer skin 1 is provided by a frame 2 made of horizontal beams 16 and vertical beams 18 that intersect at a right angle in the present example without any added connecting parts.

The door moreover comprises locking stops 3 intended to interact with a mechanism located on the door framework to lock the door in the closed position. The door also comprises other items of equipment such as supports 4 for rotationally mounting a transverse shaft intended for the mechanisms that will be borne by the door.

The beams 16, 18 that constitute the frame 2 each have a core 5 formed by a planar wall of predetermined thickness (of about one millimeter to half a centimeter) that projects from the outer skin 1. In the present example, the core 5 projects substantially perpendicularly to the skin 1. The beams 16, 18 also have a flange 6 extending perpendicularly to the core 5, on the opposite side to the skin 1. The flanges 6 preferably extend substantially perpendicularly to the skin 1.

The frame 2 thus has an external face connected to the outer skin 1 and an internal face connected to the flanges 6.

Furthermore, in this example the door has a curvature along a horizontal axis in order to be adapted to the cylindrical shape of the fuselage of the aircraft. As a variant, the door may also have a double curvature, with one curvature along a vertical axis in addition to the curvature along a horizontal axis, in order to be adapted to a tapered fuselage.

At the joins between the beams 16, 18, the cores 5 of the beams are joined together by continuity of material, the same applying for the flanges 6 which form lattices. A particularly rigid door exhibiting significant static and dynamic integrity is thus obtained.

FIGS. 3 to 10 illustrate the method for manufacturing the door of FIGS. 1 and 2.

A first step consists in producing a substantially flattened blank forged by any known forging means, for example by cold rolling, open-die forging, or hot rolling. This operation is performed on a stampable alloy suitable for aeronautics, such as a 7050, 7010 or 2050 aluminum alloy. The forged blank may be for example a rectangular parallelepiped corresponding to the dimensions of the door. This blank is substantially planar, that is to say that its thickness is substantially constant, possibly with slight variations in thickness to meet the local needs in terms of material on the surface of the door.

Figure 3:
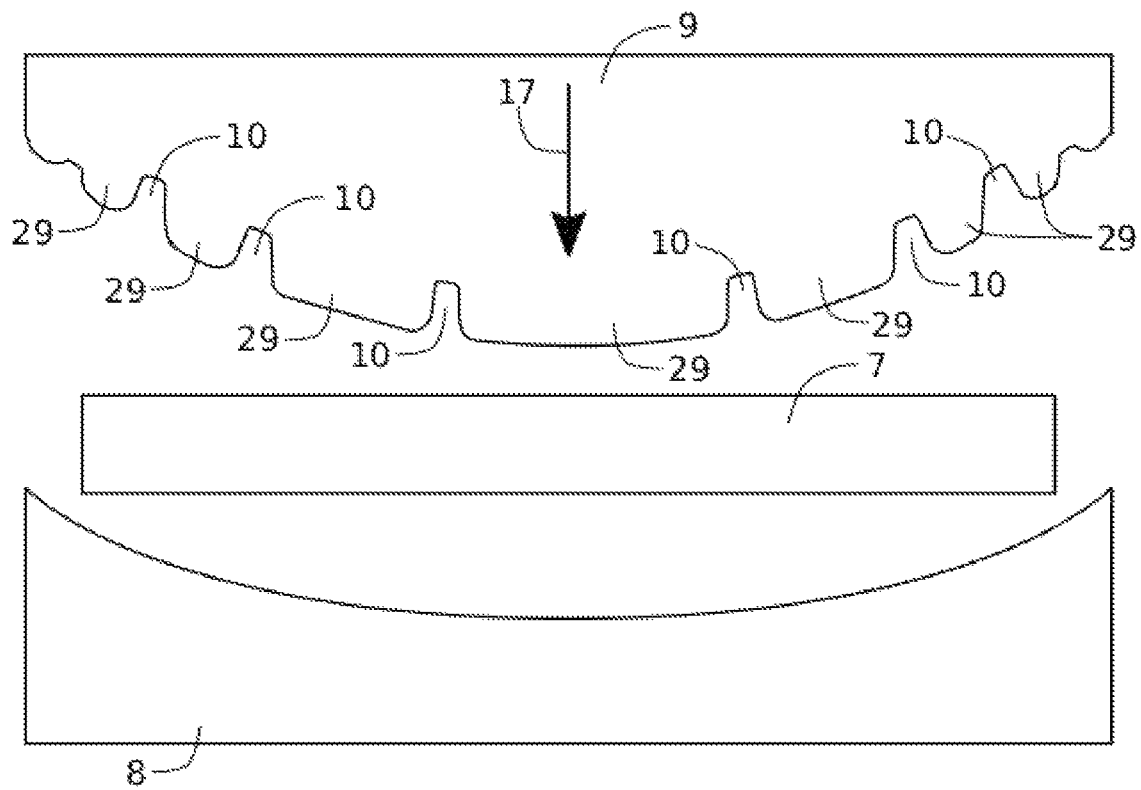
FIG. 3 illustrates the stamping operation of the manufacturing method according to the invention.

In a following step, illustrated in FIG. 3, the forged blank 7 is stamped between a lower die 8 and an upper die 9 in a stamping direction 17. FIG. 3 is a basic schematic view, in a section corresponding to a section through a vertical plane of the door, with schematically depicted forms and proportions.

In this example, the forged blank 7 may be formed by a shape extending in a plane (the blank 7 is a right-angled parallel in this case). As a variant, the blank 7, while still having a substantially constant thickness, may be pre-arched to impart the corresponding curvature to the final curvature of the door.

The lower die 8 has a work surface which is smooth and which corresponds to the external surface of the outer skin 1. The upper die 9 is intended to form a cellular structure in the blank 7. To that end, the upper die 9 defines the negative of the cells by virtue of the punches 29, the form of which corresponds to the empty spaces between the beams 16, 18 of the frame 2 on the finished door after the machining operations. Between the punches 29, the upper die 9 has recesses 10 intended to form ribs corresponding to the beams 16, 18 of the frame 2.

FIG. 3 schematically shows that the width of the recesses 10 tends to increase from the middle to the edges of the door in the direction 25 (which corresponds to the vertical direction of the door).

Figure 4:
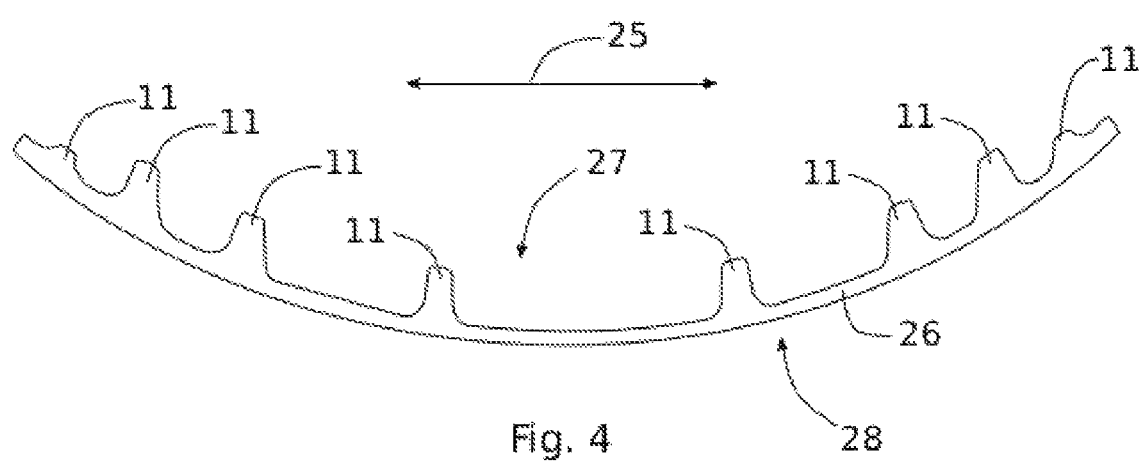
FIG. 4 is a view in section of the stamped part obtained by the stamping operation of FIG. 3.

FIG. 4 illustrates the result of the stamping operation corresponding to the door of FIGS. 1 and 2. In practice, the result of FIG. 4 will be able to be obtained with one or more stamping operations, since the forms required may necessitate multiple stamping operations with a gradual increase in the fineness of the passes.

The stamping is carried out by moving the dies close to the press leaving a clearance between the dies, this clearance corresponding to the desired thickness for the wall corresponding to the outer skin 1. With reference to FIG. 4, the stamped part 26 obtained is a cellular structure having an open face (the face corresponding to the internal face of the door) and a closed face (the face corresponding to the external face of the door), which is closed by a wall which has a thickness corresponding to the clearance and which corresponds to the outer skin 1.

In FIG. 4, the stamped part 26 has eight ribs 11 of material, corresponding to eight horizontal beams 16 of the door.

Figure 5:
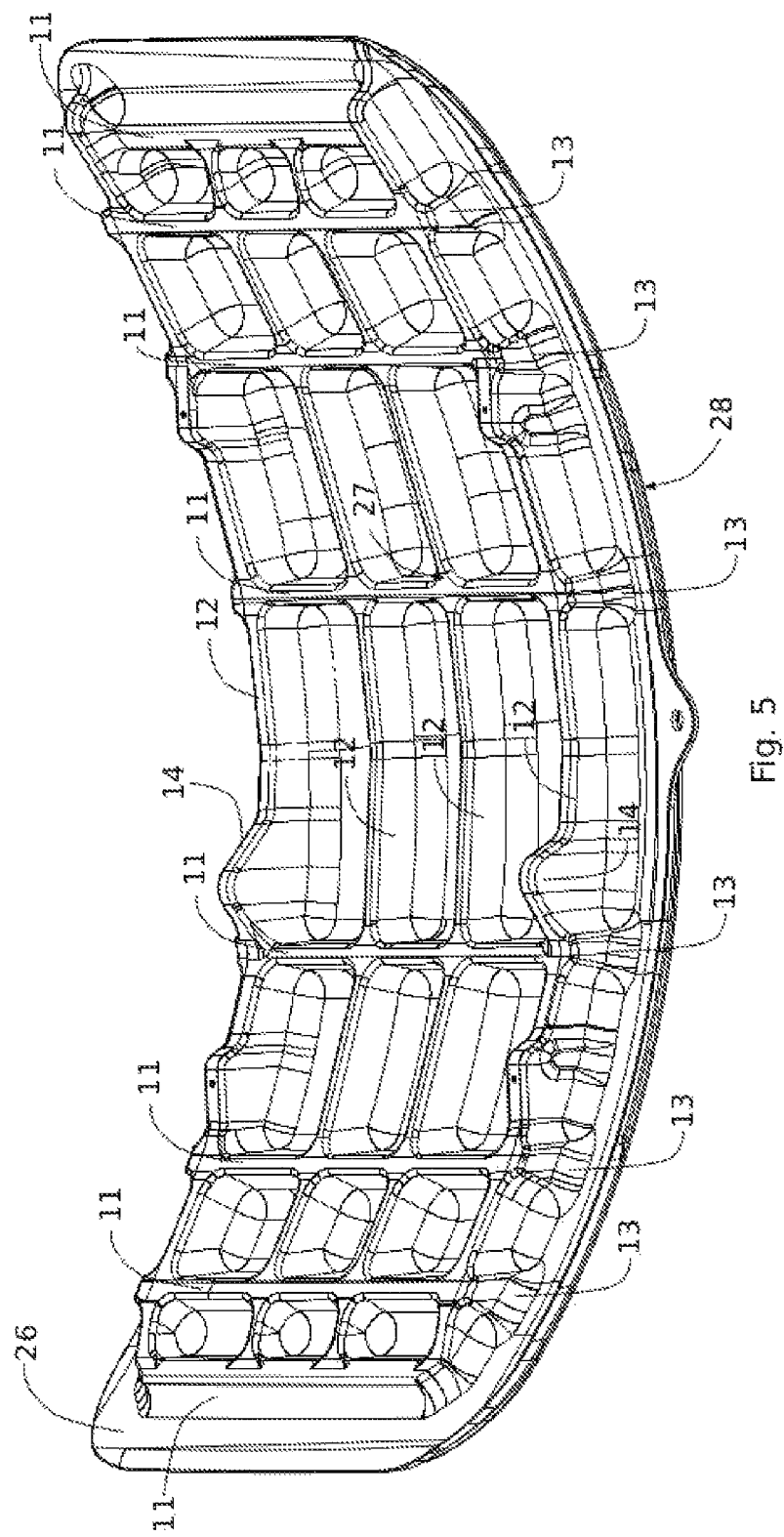
FIG. 5 is a perspective view of the stamped part of FIG. 4.

The stamped part is also shown in perspective in FIG. 5. The stamped part 26 has the final arching corresponding to the curvature of the door and comprises the ribs 11 corresponding to the horizontal beams 16 and ribs 12 corresponding to the vertical beams 18.

The stamped part of FIG. 5 moreover has blocks 13 of material located at the positions of stops 3 of the door, and blocks 14 of material located at the positions of supports 4, and possibly other additional blocks of material for any other items of equipment provided on the door.

All of the ribs 11, 12 and blocks 13, 14 of material have a taper angle relative to the stamping operation, for example 7° on either side of the stamping direction. For the vertical ribs 12, which extend in a plane parallel to the stamping direction 17, the curvature of the door does not interfere with the stamping and the taper angle will simply be applied on either side of the rib 12.

Figure 6:
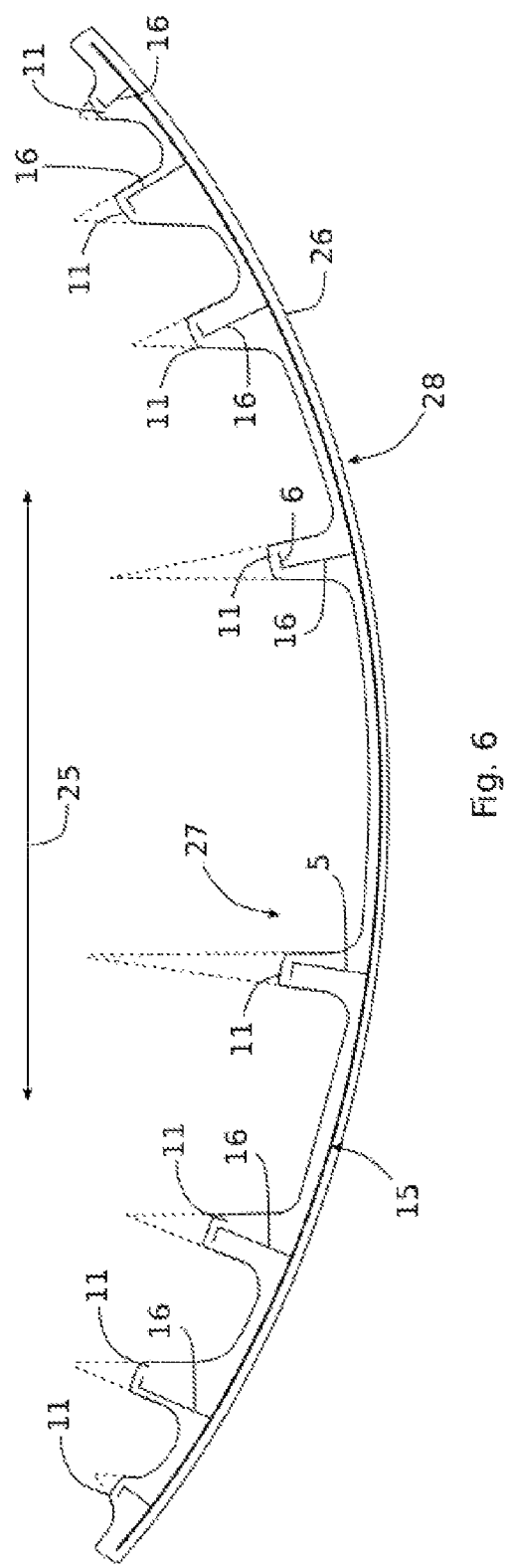
FIG. 6 shows the stamped part of FIG. 3 with its machining profile.

With respect to the horizontal ribs 11, the stamping interferes with the curvature of the door. FIG. 6 illustrates the stamped part 26 with a superimposed illustration of the profile 15 of the finished door. This profile 15 thus has the outer skin 1 and the eight horizontal beams 16 of the door. This figure takes account of the material to be removed on each rib 11 to form the beams 16.

In FIG. 6, each form of a rib 11 (and therefore the form of each recess 10 of the upper die 9) is provided on the basis of the orientation of the desired beams 16. Each form of a rib 11 corresponds to a form of a recess 10 of the upper die 9.

In relation to the stamping direction 17, the beams closest to the median horizontal axis of the door are virtually parallel to the stamping direction 17, such that the corresponding rib 11 substantially symmetrically surrounds the future beam 16 and the rib 11 is therefore substantially symmetrical.

With increasing distance away toward the top and bottom ends of the door, the ribs 11 are thicker since the inclination of the future beam 16 causes asymmetry:

on one flank, the rib 11 is closest to the future beam 16, substantially parallel to the core 5;

on the other flank, the rib 11 is further away from the future beam 16, with an angle close to twice the taper angle, measured from the future beam 16.

Thus, the ribs 11 located closest to the center (in the direction of curvature 25) have, with respect to the ribs 11 located further away from the center, that is to say closer to the top and bottom ends of the door:

a smaller thickness;

side walls that form a smaller angle between one another.

The stamped part 26 is then machined so that the beams 16, 18 are produced by removing material on the ribs 11 and 12.

Figure 7:
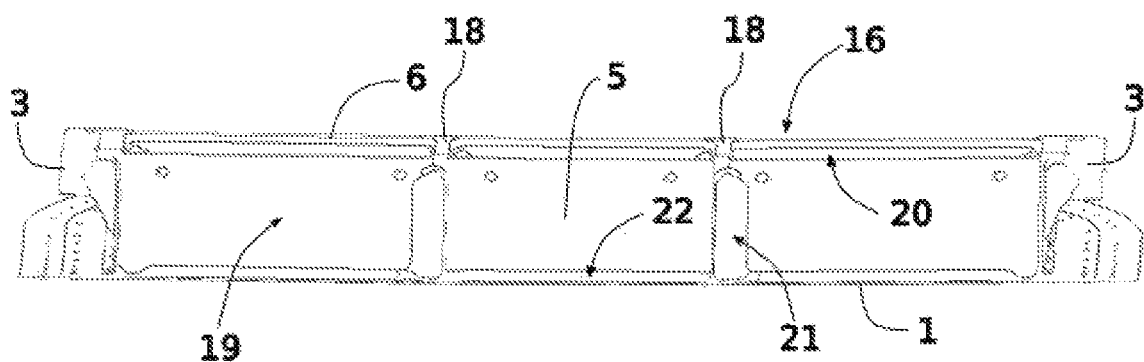
FIG. 7 is a view in section through a horizontal plane of the door of FIG. 1.

FIG. 7 is a view in section of the door of FIGS. 1 and 2 in a median horizontal plane. This FIG. 7 illustrates the various machining zones necessary to form the beams 16, 18. These machining zones are:

zones 19 corresponding to the flank of the core 5 of the beam;

zones 20 corresponding to underneath the flanges 6;

zones 21 corresponding to the join between the cores 5 of the beams 16, 18;

zones 22 corresponding to the join between the frame 2 and the outer skin 1.

These zones are the same for all of the beams 16, 18 of the door.

Figure 8:
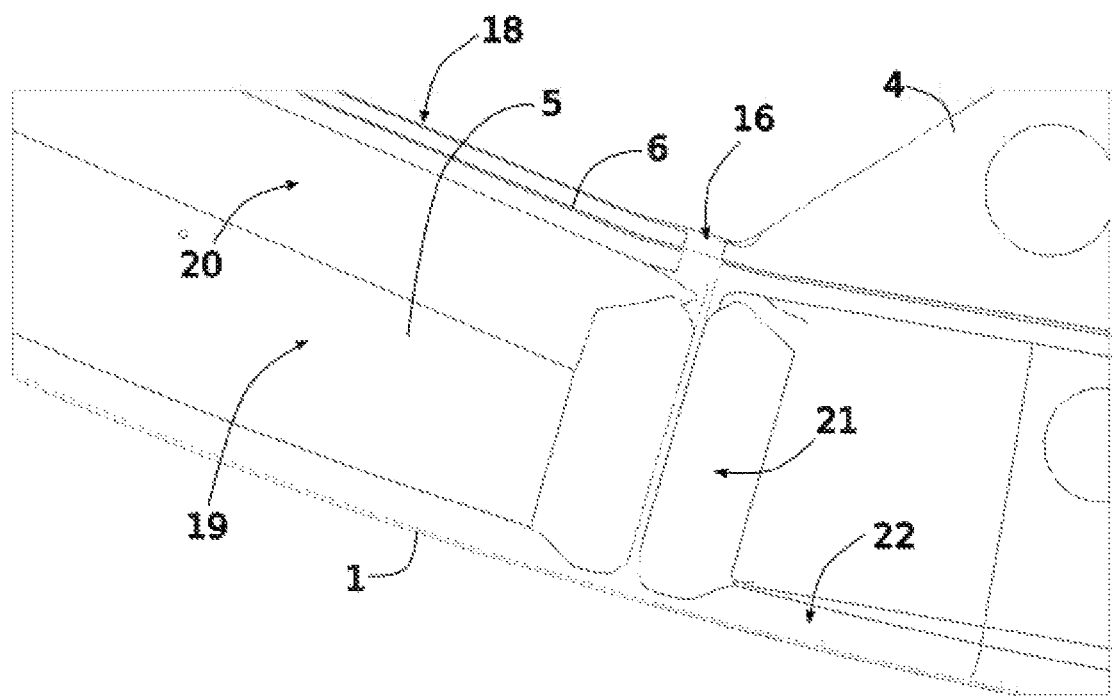
FIG. 8 is an enlarged view of a section through a vertical plane of the door of FIG. 1.

FIG. 8 is an enlarged view showing the machining zones, this time in vertical section through a portion of the door. In a particularly advantageous embodiment, the machining zone 20 extends over the bottom of the flange 6 and over a portion of the flanks of the core 5. The operation of machining this zone is carried out in accordance with FIG. 9 with a side-and-face milling cutter 23 with a diameter which is adapted to the width of the corresponding flange 6. The side-and-face milling cutter 23 thus machines the bottom of the flange 6 and an upper portion of the core 5 in one pass, with favorable accessibility even though this operation is carried out in a nook.

This machining operation thus makes it possible, in a single pass, to define a reinforcement delimited on one side by the core 5 and on the other side by the flange 6.

Another machining operation targeting the zone 19 is then concerned with finishing the machining of the flank of the core 5. This machining operation is carried out in accordance with FIG. 10 by a conical milling cutter 30, which likewise promotes accessibility in this context. The conical milling cutter 30 machines the portion of the core 5 located below a flange 6, the axis of the milling cutter being oblique with respect to the plane of the core 5.

Figure 9:
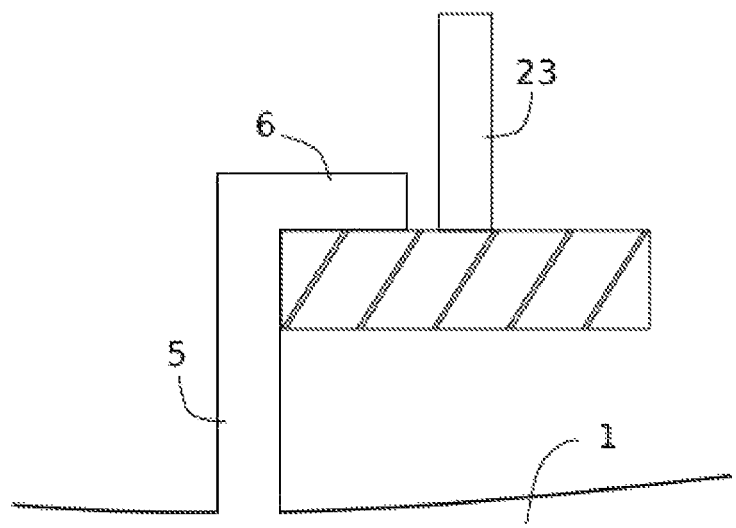
FIG. 9 illustrates a machining operation of the method according to the invention.
Figure 10:
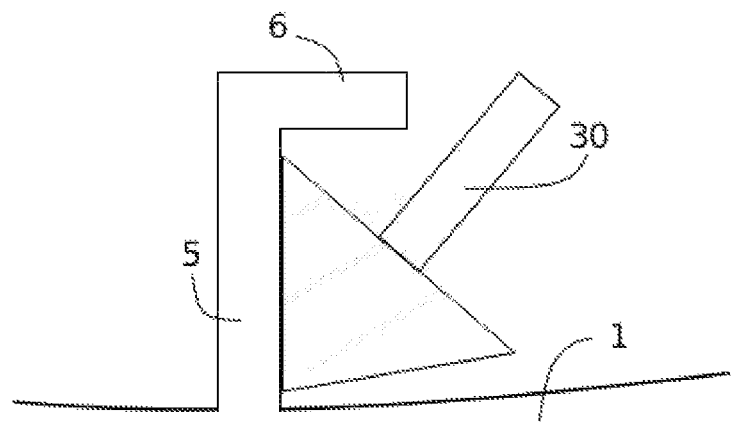
FIG. 10 illustrates another machining operation of the method according to the invention.

The machining operations of FIGS. 9 and 10 make it possible, in two simple types of machining operations, to produce the forms of the frame 2 that are the most inaccessible and the most essential for the formation of the door.

The other contours of the flange 6, the stops 3, and supports 4, can furthermore be machined conventionally by milling cutters, drill bits, and any other conventional tool.

The machining zone 22 can preferably be produced by a spherical milling cutter passing over the join between the core 5 and the outer skin 1.

The zone 21 is preferably machined by a hemispherical milling cutter that operates vertically and has a spindle length which is adapted to the problem of accessibility.

Moreover, the surfaces forming the internal and external faces of the outer skin 1 may be obtained directly by the stamping, or also machined, depending on the surface finish and the desired dimensional tolerances.

Figure 11:
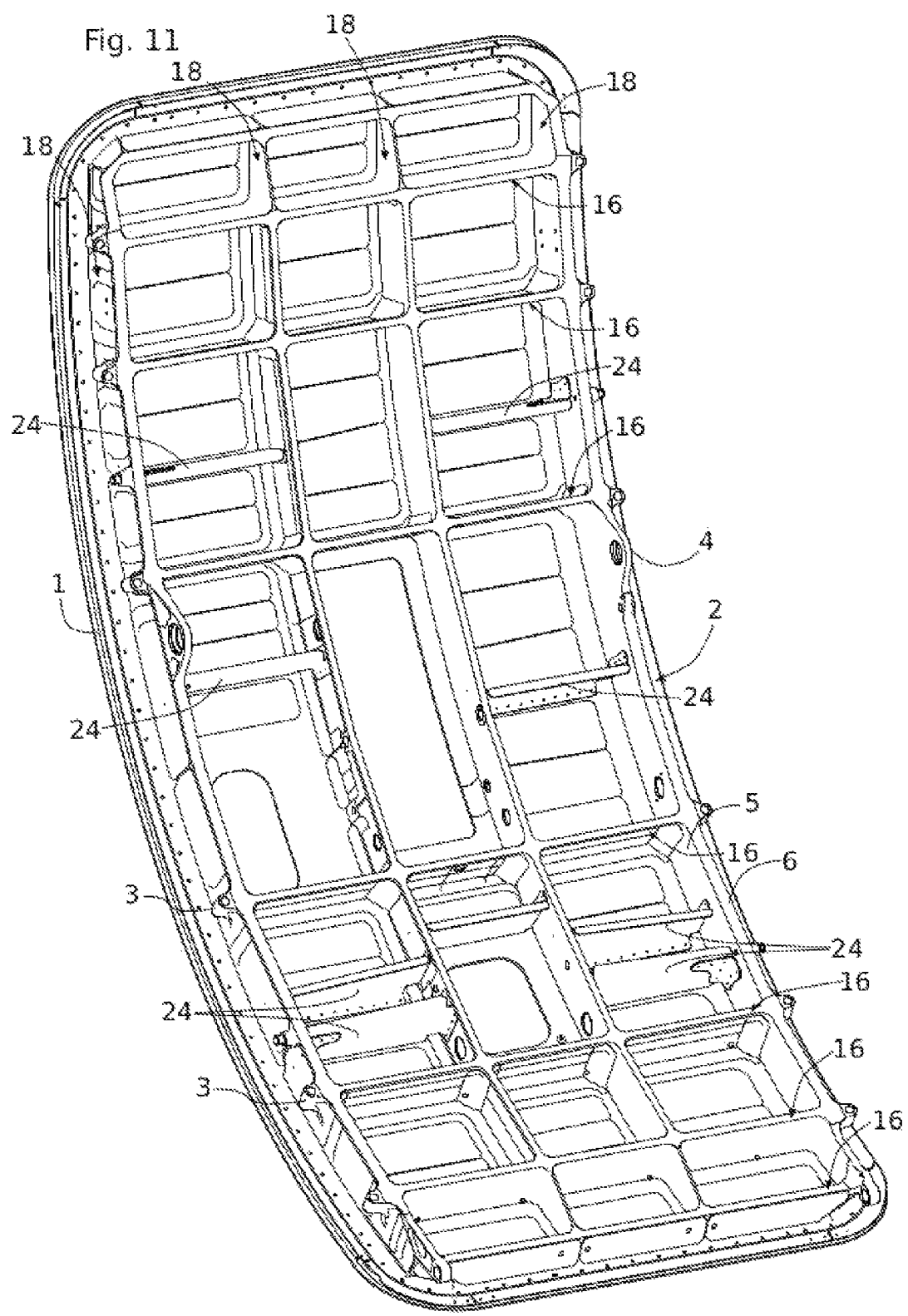
FIG. 11 shows a variant of the door of FIG. 1.

FIG. 11 shows a variant of the door of FIGS. 1 and 2. In this variant, most of the frame 2 is made by virtue of the method according to the invention. However, additional beams 24 are fitted on the frame by known fixing means. Such a door thus combines portions obtained according to the invention and portions fitted conventionally.

The door is thus obtained solely using operations making it possible to benefit from the favorable mechanical properties afforded by the forging from the raw material through to the finished product. This is because the stamped part 26 is intended to undergo these machining operations which do not interfere with the orientation of the fibers of the material. The stamping operation can moreover be adjusted by influencing parameters such as the stamping temperature, the thickness and the forms of the blank 7, or any other forging technique parameter, to vary the mechanical properties of the whole of the door, such as the yield strength or the tensile strength.

Variant embodiments of the method for manufacturing the aircraft door can be implemented without departing from the scope of the invention. As a variant with respect to FIGS. 9 and 10, the flange 6 may be centered on the core 5 rather than being cantilevered.

The invention claimed is:

1. A method for manufacturing an aircraft door having a monolithic structure comprising an outer skin (1) and an internal frame (2) in one piece, the internal frame (2) having at least one portion having: a core (5) attached transversely to the outer skin (1); and a flange (6) opposite the outer skin (1);

the method comprising the following steps:

producing a forged blank (7) with a constant thickness from a metal alloy that can be stamped;

stamping the forged blank (7) between a smooth lower die (8) and an upper die (9) defining cells, a clearance being retained between the lower die (8) and the upper die (9), and obtaining a stamped part (26) with a cellular structure having an open face (27) and a closed face (28) closed by a wall with a thickness corresponding to the clearance;

machining the internal walls of the cellular structure of the stamped part (26) to define at least one reinforcement delimited: by a core (5) connecting the closed face (28) and the open face (27); and by a flange (6) projecting substantially perpendicularly to the core (5), on the open face (27) of the stamped part (26).

2. The method as claimed in claim 1, wherein the upper die (9) has punches (29) surrounded by recesses (10) defining said cells.

3. The method as claimed in claim 1, wherein the lower die (8) and the upper die (9) are arched along a curvature defining a curvature for the aircraft door.

4. The method as claimed in claim 3, wherein the cellular structure of the stamped part (26) is produced by intersecting ribs (11, 12).

5. The method as claimed in claim 3, wherein the forged blank (7) is planar and arched by the stamping operation.

6. The method as claimed in claim 3, wherein the forged blank (7) is pre-arched along the same curvature as the arching of the dies (8, 9).

7. The method as claimed in claim 4, wherein some of the ribs (11) are perpendicular to the direction of curvature (25).

8. The method as claimed in claim 7, wherein from among said ribs (11) that are perpendicular to the direction of curvature (25), those located closer to the center of the stamped part (26), in the direction of curvature (25), have side walls forming an angle less than the angle formed by the side walls of those located further away from the center.

9. The method as claimed in claim 7, wherein the ribs (11) are located at a closer distance to the center of the stamped part (26), in the direction of curvature (25), have a smaller thickness than those located further away from the center, the thickness of the ribs (11) increasing with their distance to the center of the stamped part (26).

10. The method as claimed in claim 1, wherein the machining step includes a machining operation using a side-and-face milling cutter (23) machining the bottom of the flange (6) and a corresponding portion of the core (5) at the same time.

11. The method as claimed in claim 1, wherein the machining step includes a machining operation, using a conical milling cutter (30), machining a portion of the core (5) located under a flange (6), the axis of the milling cutter being oblique with respect to the plane of the core (5).

12. The method as claimed in claim 1, wherein during the stamping operation, blocks (13) of material are formed on the cellular structure of the stamped part (26), and includes an additional machining step of machining the blocks (13) to form locking stops (3) for the aircraft door.

\* \* \* \* \*